United States Patent [19]

Garcia Clavel et al.

[11] 4,342,729

[45] Aug. 3, 1982

[54] METHOD FOR OBTAINING ALUMINA FROM CLAYS

[75] Inventors: Emilia Garcia Clavel, Zurbano, 58; Jesús Martinez Lope, Torrelaguna, 125; Teresa Casais Alvarez, all of Madrid, Spain

[73] Assignees: Jesus Martinez Lope; Emilia Garcia Clavel, both of Madrid, Spain

[21] Appl. No.: 169,903

[22] Filed: Jul. 17, 1980

[30] Foreign Application Priority Data

Jul. 26, 1979 [ES] Spain .................................. 482.881

[51] Int. Cl.³ .............................................. C01F 7/26
[52] U.S. Cl. .................................. 423/127; 423/115; 423/119; 423/131; 423/111
[58] Field of Search ............... 423/114, 115, 117, 119, 423/127, 131, 132

[56] References Cited

U.S. PATENT DOCUMENTS

| | | | |
|---|---|---|---|
| 914,187 | 3/1909 | Rinman | 423/114 |
| 957,848 | 10/1910 | Emanuel | 423/131 |
| 1,160,431 | 11/1915 | Mellen | 423/131 |
| 1,675,157 | 6/1928 | Brown | 423/131 |
| 1,681,921 | 8/1928 | Bjorkstedt | 423/131 |
| 1,752,599 | 4/1930 | Kigellgren | 423/131 |
| 2,160,148 | 5/1939 | Hunyady | 423/114 |
| 2,250,186 | 5/1941 | Noll | 423/131 |
| 2,375,977 | 5/1945 | Davies et al. | 423/114 |
| 2,388,983 | 11/1945 | Lyons | 423/131 |
| 3,839,536 | 10/1974 | Sato et al. | 423/132 |

FOREIGN PATENT DOCUMENTS

| | | | |
|---|---|---|---|
| 17524 | 12/1928 | Australia | 423/115 |
| 25228 | of 1908 | United Kingdom | 423/111 |
| 139005 | 2/1920 | United Kingdom | 423/132 |

*Primary Examiner*—Herbert T. Carter
*Attorney, Agent, or Firm*—Wenderoth, Lind & Ponack

[57] ABSTRACT

Disclosed is a method for obtaining alumina from silicates by calcining a dry mixture of the silicate and an alkali metal or ammonium salt, such as the sulphate, bisulphate, sulphite, etc. and dissolving the reaction product in water or an aqueous alkali. Hydrated alumina is precipitated from the resulting solution and calcined to alumina.

10 Claims, No Drawings

METHOD FOR OBTAINING ALUMINA FROM CLAYS

INTRODUCTION

World demands for aluminum constantly increase, while the reserves of bauxite, the only mineral from which the alumina (raw material for obtaining) is extracted, so far, are limited. The few countries of the world which are producers of bauxite, e.g. Guinea, Jamaica, Australia and British Guiana, have an agreement, as OPEC does, for establishing the control and commercialization of their production, and for encreasing their benefits by increasing the prices.

In particular, in the case of Spain, where there are no bauxite fields, and with production of alumina still very limited, the importation of alumina and bauxite grows constantly, with the consequent foreign exchange expense and the international dependence which accompanies.

| Spanish importations of aluminum minerals, alumina and hydrated alumina | |
|---|---|
| Year 1970 | Tons |
| Aluminum minerals (bauxite, etc) | 93,212 |
| Alumina | 236,534 |
| Hydrated alumina | 8,972 |
| Year 1978 | Tons |
| Aluminum minerals (bauxite, etc) | 102,398 |
| Alumina | 419,910 |
| Hydrated alumina | 12,315 |

All non producing bauxite countries necessarily have the same problem.

Such situation makes obligatory the search for new techniques of production for alumina from non-bauxite minerals: kaolins and clays in general, of which the world reserves are inexhaustible. It was a true challenge to a technology. Methods employing clays as raw material have been proposed, but they have not had, generally, industrial application, because they are not profitable.

On the other hand, given the abundance and the relative cheapness of kaolin, the posibility of new applications of kaolin are being investigated constantly.

Spain, as is known, has numerous and varied fields of kaolin, dispersed along a great part of the land, mainly in the northwest zone, Galicia-Asturias, and in the central-oriental zone, Valencia-Teruel-Cuenca. Actually, about 490 concessions have been given, which cover more of 53,000 ha., but only about 170 real exploitations, and very few installations of treatment: in all, 65 approximately, almost exclusively in Galicia. If Spanish kaolins are so poorly exploited, is because the kaolins are employed as such only in certain industries (ceramics, paper, etc).

According to the opinion of the specialists in mining, the production of kaolin in Spain could increase easily, if the demand were higher.

Therefore, our method is doubly valuable, so that it provides alumina in a profitable manner, from a national raw material which is abundant and cheap.

From all the above-mentioned considerations is deduced the national and even international interest in a project for obtaining alumina from clays, which is the subject of the present invention.

The present method, on the other hand, may be applied to other non clay raw materials: aluminum silicates in general.

DESCRIPTION OF THE METHOD

The instant method for obtaining alumina consists essentially of reacting by a dry method, clay or any aluminum silicate in general, with a reagent such as sulphates, bisulphates, pyrosulphates, thiosulphates, sulphites, phosphates, phosphites, etc., of alkali or ammonium metals.

The resultant products are calcinated in an oven at between 300° and 750° C., for a period of time between 45 and 120 minutes.

A double salt of aluminum-alkali or ammonium is obtained as a result of the calcination, together with silica, unreacted aluminum silicate and a percentage impurities, more or less extensive according to the resultant product.

The double salt of aluminum is separated from the other components by dissolution in water or alkalis, in this case the aluminum remains as alkali aluminate. The purity of the alumina obtained as result of the reaction depends of the solvent employed for the separation, the purity of the alumina is higher when alkalis are employed as solventds.

Subsequently, the aluminum is precipitated as the hydroxide from the solution of the double salt of aluminum or from the alkali aluminate, following any of the known methods, and by calcination of the aluminum hydroxide is obtained the alumina, in any of its crystal forms, according to the temperature of calcination

ADVANTAGES OF THE PROPOSED METHOD

According to the foregoing, the method obtains alumina by dry method, with its evident advantages of equipment and manipulation. The starting mixture and the reaction product are solids. This reaction allows one to obtain the alumina with a major or minor degree of purity according to the extracting solution employed: a simple alkaline or aqueous solution. The election of one or other extracting solution will depend of the use for which the alumina will be employed.

The raw material does not need any treatment previous to the proper reaction. In the case of the kaolins, it is sufficient to remove the excess sand which always accompanies these clays by washing. Grinding is not necessary either, because a particular size of particle is not required.

The reagent is also solid and is mixed with the starting material mechanically, without previous grinding, without need for a particular size of grain.

The reaction is practically stoichiometric, so that it is unnecessary to operate with an excess of reagent.

The reaction temperature is relatively low and the reaction time is short.

The solubilization of the alumina extracted in the reaction is carried out at room temperature and normal pressure, therefore, the installations necessary do not present any complexity.

The precipitation of the solubilized aluminum may be carried out in different ways, all simple and employing amounts of reagent relatively small, cheap and recoverable quantitatively for practical purposes.

The efficiency of the reaction is about 70–80% expressed as alumina obtained/alumina contained in the clay.

Finally, the insoluble residums of the dry method reaction which comprise silica and a little clay, and in some cases by calcium carbonate too, are perfectly profitable for the fabrication of cement. This, also makes the obtention of the alumina more economical.

As a orientative but not restrictive description of the invention we describe now an example of the most profitable reaction: the obtention of alumina from kaolin by reaction with sodium or potassium bisulphate.

EXAMPLE

The kaolin, washed previously, is mixed mechanically, in the dry state, with sodium or potassium bisulphate, to obtain a solid and homogeneous mixture. This mixture is calcined in an oven at a temperature between 300° and 750° C., during a period of time between 45 and 120 minutes. The calcination will produce in the solid mixture the following reaction:

$$Al_2O_3 \cdot 2SiO_2 \cdot 2H_2O + 6NaHSO_4 \cdot H_2O(6KHSO_4) \rightarrow 2Na_3Al(SO_4)_3(6\ K_3Al(SO_4)_3) + 2SiO_2$$

at is, two new compounds have been produced: silica and sodium-aluminum sulphate (or potassium-aluminum sulphate).

The sodium-aluminum sulphate (or potassium-aluminum) is soluble both in water and in acid or basic medium (in cold or in hot), so it is sufficient to dissolve the product of the reaction in any of these solvents in order to separate by filtration, as an insoluble residuum, practically all the silica produced in the reaction, and the rest of the kaolin, which remained unreacted passing into solution all of the aluminum with a small percentage of impurities: silicon, iron and titanium.

Afterwards, the alumina contained in any of the solutions above mentioned is precipitated as hydrated alumina.

According to the solvent employed the purity of the hydrated alumina varies.

We will now describe in detail the process of solubilization and precipitation of the aluminum with two different solvents: an aqueous medium and a basic medium.

Solubilization in aqueous medium

As we have mentioned before, treating the reacted solids (which is a mixture of silica, sodium-aluminum sulphate or potassium-aluminum and the unreacted kaoline) with water a solution of aluminum is obtained, in which there are also sulphates, sodium (or potassium) ions, and impurities of silica, iron and titanium.

If we add to this aqueous solution, the necessary amount of an alkali (sodium) potassium or ammonium hydroxide or carbonate), the aluminum is precipitated as the hydroxide.

As is known, when we calcine aluminum hydroxide, it is transformed in alumina, under one of its crystalline forms, according to the calcination temperatura employed. If this temperature is about 1200° C., the α-alumina is obtained.

The hydrated alumina precipitated according to the above mentioned, is separated from the solution by filtration. It is washed and calcined at 1200° C. to obtain α-alumina. This alumina is sufficiently pure; it has practically no silicon (Si<0.05%), Ti<0.1% and Fe 1-2%, the percentages expressed as oxides of the elements. This alumina has many uses without any other further treatment.

As an example, here we present the compositions of two kaolins and two aluminas extracted from them.

|  | Composition | |
|---|---|---|
| Kaolin A | | |
| | SiO$_2$ | 55.10% |
| | Al$_2$O$_3$ | 28.60% |
| | Fe$_2$O$_3$ | 1.43% |
| | TiO$_2$ | 0.19% |
| | CaO | 0.77% |
| | MgO | 0.30% |
| | Na$_2$O | 0.55% |
| | K$_2$O | 3.53% |
| | Calcination loss | 8.70% |
| α-alumina obtained | | |
| | Al$_2$O$_3$ | 97.70% |
| | Fe$_2$O$_3$ | 2.20% |
| | SiO$_2$ | 0.04% |
| | TiO$_2$ | 0.10% |
| Kaolin B | | |
| | SiO$_2$ | 56.19% |
| | Al$_2$O$_3$ | 31.06% |
| | Fe$_2$O$_3$ | 0.50% |
| | TiO$_2$ | traces |
| | CaO | 0.31% |
| | MgO | 0.09% |
| | Na$_2$O | 0.12% |
| | K$_2$O | 0.62% |
| | Calcination loss | 110.96% |
| α-alumina obtained | | |
| | Al$_2$O$_3$ | 98.85% |
| | Fe$_2$O$_3$ | 1.07% |
| | SiO$_2$ | 0.05% |
| | TiO$_2$ | 0.03% |

The composition of the mother liquors, of course differ, depending on whether precipitation of the aluminum hydroxide is carried out with alkali or with carbonate.

1$^{st}$ situation. If the precipitation is carried out with alkali, the mother liquors, after the filtration of the aluminum hydroxide, are pure solutions of sodium sulphate, potassium sulphate or mixtures of ammonium and potassium sulphates according to the precipitating alkali employed. By evaporation of said solutions, crystals of the mentioned sulphates are obtained, which will be employed for obtaining new amounts of reagent (sodium or potassium bisulphate), or as fertilizers.

2$^{nd}$ situation. If the precipitation of the aluminum hydroxide is carried out with sodium or potassium carbonate, in the mother liquors besides sodium and sulphate ions or potassium and sulphate ions, carbonate ions will be present too. In this case, we may add to them sulphuric acid before proceeding to their concentration, which will release of the correspondent carbon dioxide and the direct crystallization of the sodium bisulphate or potassium bisulphate. Likewise, the whole reagent consumed in the initial reaction of extraction of alumina from kaolin, by dry method, is substantially recovered.

Solubilization in alkaline medium

If the sodium-aluminum sulphate or potassium-aluminum sulphate, AlNa$_3$(SO$_4$)$_3$ or AlK$_3$(SO$_4$)$_3$, product of the dry method reaction, is dissolved in sodium or potassium hydroxide, so that the whole aluminum remains in the solution as sodium or potassium a aluminate, then the insoluble silica is separated along with the totality of iron and titanium.

Instead of sodium and potassium hydroxide the respective carbonate with lime may be employed. Given that, adding lime to an alkaline carbonate solution, the following reaction takes place:

$$Na_2CO_3 + H_2O + CaO \rightarrow 2NaOH + CaCO_3$$

releasing the amount of hydroxide necessary for the formation of the aluminate, so that the insoluble residuum, which remains when the aluminate solution is separated, is formed, besides the silica and the iron and titanium hydroxide, by calcium carbonate.

Once, the precipitation of the aluminum hydroxide is carried out according to the three possible variants, there is obtained a very pure aluminum hydroxide, suitable for use (after its calcination and transformation in $\alpha$-alumina) in the obtention of aluminum by electrolysis.

1$^{st}$ variant. The acidulation of the aluminate solution with sulphuric acid:

$$2NaAlO_2 + H_2SO_4 + 2H_2O \rightarrow 2Al(OH)_3 + Na_2SO_4$$

2$^{nd}$ variant. Dilution with water of the aluminate solution, according to the following hydrolysis reaction:

$$NaAlO_2 + 2H_2O \rightarrow Al(OH)_3 + NaOH$$

3$^{rd}$ variant. Carbonatation of the solution with carbon dioxide, according to the following reaction:

$$2NaAl(OH)_4 + CO_2 \rightarrow 2Al(OH)_3 + Na_2CO_3 + H_2O$$

In any case, the precipitation velocity must be controlled for obtaining particles of great size.

The precipitate of aluminum hydroxide (more correctly: hydrated alumina) is separated by filtration, washed and calcined to eliminate the hydratation water and to transform it into the no-hygroscopic form, $\alpha$-alumina.

The composition of the aluminas, obtained with this alkaline treatment of the reacted solid products, for both kaolins, A and B above mentioned, is the following:

| $\alpha$-alumina | Composition |
|---|---|
| $Al_2O_3$ | 99.96% |
| $SiO_2$ | 0.03% |
| $Fe_2O_3$ | 0.008% |
| $TiO_2$ | 0.001% |

The degree of purity of this alumina is in the order of the $\alpha$-aluminas usually employed for aluminum production by electrolysis.

Their real and apparent density are in the order of the densities of the mentioned aluminas.

The mother liquors resultants of the separation by filtration of the precipitate of hydrated alumina are solutions, which according to the applied variant, contain respectively the following ions:

1$^{st}$ variant. Sulphate, sodium (or potassium) and hydrogen ions. The subsequent evaporation of the solution will provide sodium bisulphate (or potassium bisulphate) very pure, suitable for being employed in new reactions for obtention of alumina from kaolin, or from clay or non-clay raw materials from which we had started.

2$^{nd}$ variant. Sulphate and sodium (or potassium) ions. In this case, before the evaporation, it is necessary to add to the mother liquors a defined amount of acid for obtaining, like, in the preceing case, very pure crystals of (sodium or potassium) bisulphate.

3$^{rd}$ variant. Besides the sodium (or potassium) bisulphate, there is also the respective carbonate. The subsequent addition of sulphuric acid and the evaporation of the solution will cause the release of carbon dioxide and the direct crystallization of (sodium or potassium) bisulphate.

The recovery of the bisulphate is, practically total, like in the previous cases, and with regard to the carbon dioxide release, may be employed for new carbonations of aluminate solutions.

We claim:

1. Method for obtaining alumina from aluminum silicates which consists essentially of:
   (a) calcining a stoichiometric dry mixture of aluminum silicate and sodium or potassium bisulphate to a temperature between 300° and 750° C. for 45–120 minutes to form a reaction product comprising the corresponding double salt $(AlMe_3(SO_4)_3)$ where Me is Na or K, and $SiO_2$,
   (b) dissolving at room temperature the reaction product of step (a) in an aqueous alkali to form an alkali aluminate solution, or in water to form an aqueous solution of said double salt,
   (c) separating the solution of step (b) from said $SiO_2$,
   (d) precipitating hydrated alumina from the solution of step (c),
   (e) recovering the hydrated alumina from step (d), and
   (f) calcining the hydrated alumina of step (d) to form alumina.

2. The method according to claim 1 wherein the aluminum silicate is kaolin.

3. The method according to claims 1 or 2 wherein aqueous alkali is employed in step (b) to dissolve said double salt.

4. The method according to claim 1 wherein clay containing iron and titanium impurities is employed as the aluminum silicate of step (a).

5. The method according to claim 4 wherein said iron and titanium impurities are separated from said solution in step (c) along with $SiO_2$.

6. The method according to claims 1, 2 or 4 wherein 70–80% of the alumina of the aluminum silicates is recovered.

7. The method according to claim 3 wherein the alumina obtained comprises 99.96% of $Al_2O_3$.

8. The method according to claims 1, 2 or 4 wherein the mother liquor from step (d) is converted to sodium or potassium bisulphate.

9. The method according to claims 1, 2 or 4 wherein water is employed in step (b) to dissolve said double salt.

10. The method according to claim 8 wherein the alumina obtained comprises 98% of $Al_2O_3$.

* * * * *

UNITED STATES PATENT AND TRADEMARK OFFICE
CERTIFICATE OF CORRECTION

PATENT NO. : 4,342,729
DATED : August 3, 1982
INVENTOR(S) : Ma Emilla Garcia Clavel et al.

It is certified that error appears in the above-identified patent and that said Letters Patent is hereby corrected as shown below:

On the title page, Item [75] Inventors: should read:

--- [75] Inventors: Ma Emilia Garcia Clavel, Zurbano, 58;
Ma Jesus Martinez Lope, Torrelaguna, 125;
Ma Teresa Casais Alvarez, all of Madrid, Spain. ---

Item [73]: should read:

--- [73] Assignees: Ma Jesus Martinez Lope and Ma Emilia Garcia Clavel, both of Madrid Spain ---.

Signed and Sealed this

Fifteenth Day of May 1984

[SEAL]

Attest:

GERALD J. MOSSINGHOFF

Attesting Officer    Commissioner of Patents and Trademarks